(12) United States Patent
Wright

(10) Patent No.: US 11,611,726 B2
(45) Date of Patent: Mar. 21, 2023

(54) APPARATUS, METHOD AND COMPUTER PROGRAM FOR IMAGE CAPTURING

(71) Applicant: Nokia Technologies Oy, Espoo (FI)

(72) Inventor: Christopher Wright, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/358,899

(22) Filed: Jun. 25, 2021

(65) Prior Publication Data
US 2022/0021851 A1    Jan. 20, 2022

(30) Foreign Application Priority Data
Jul. 16, 2020   (EP) .................................... 20186183

(51) Int. Cl.
  *H04N 9/04*    (2006.01)
  *H04N 5/232*   (2006.01)
  *G02F 1/163*   (2006.01)

(52) U.S. Cl.
  CPC ........... *H04N 9/0455* (2018.08); *G02F 1/163* (2013.01); *H04N 5/23227* (2018.08)

(58) Field of Classification Search
  CPC .. H04N 9/0455; H04N 5/23227; H04N 5/232; H04N 5/2254; H04N 5/2253; G02F 1/163; G02F 1/15; G03B 9/00
  USPC ...................................................... 348/273
  See application file for complete search history.

(56) References Cited

U.S. PATENT DOCUMENTS

| | | |
|---|---|---|
| 5,387,958 A | 2/1995 | Pashley |
| 10,180,615 B2 | 1/2019 | Kilgore et al. |
| 2017/0085769 A1* | 3/2017 | Tanaka ................. H04N 5/2355 |
| 2017/0364736 A1 | 12/2017 | Ollila |
| 2018/0120661 A1* | 5/2018 | Kilgore ................. G03B 11/00 |
| 2018/0224707 A1 | 8/2018 | Bjornard et al. |

(Continued)

FOREIGN PATENT DOCUMENTS

| | | |
|---|---|---|
| CN | 107065372 * | 8/2017 |
| DE | 102017010567 A1 | 4/2019 |
| DE | 202018006336 U1 | 1/2020 |

OTHER PUBLICATIONS

"OnePlus Shows Off a Phone With a Disappearing Rear Camera", Wired, Retrieved on Jun. 24, 2021, Webpage available at: https://www.wired.com/story/oneplus-concept-one/.

(Continued)

*Primary Examiner* — Lin Ye
*Assistant Examiner* — Chan T Nguyen
(74) *Attorney, Agent, or Firm* — Squire Patton Boggs (US) LLP

(57) ABSTRACT

Examples of the disclosure relate to apparatus, methods and computer programs for enabling sub-pixel information to be determined in captured images. The apparatus can comprise means for activating at least one filter wherein the at least one filter is positioned in front of at least one image sensor. The at least one filter is configured to at least partially filter light such that the at least one filter has a spatial variation of transparency on an analogue scale across an area covered by the at least one filter. The apparatus also comprises means for detecting an image captured by the at least one image sensor; and using information relating to the spatial variation of transparency of the at least one filter to determine sub-pixel information in the captured image.

19 Claims, 5 Drawing Sheets

(56) References Cited

U.S. PATENT DOCUMENTS

2019/0306388 A1 10/2019 Matsumoto
2019/0387194 A1 12/2019 Haseltine et al.
2020/0074959 A1 3/2020 Bhat et al.

OTHER PUBLICATIONS

"Oppo Unveils the World's First Under-screen Selfie Camera", The Verge, Retrieved on Jun. 24, 2021, Webpage available at: https://www.theverge.com/2019/6/26/18759380/under-display-selfie-camera-first-oppo-announcement.

"Love OnePlus Concept One invisible camera? You can thank McLaren and Boeing for it", OnePlus Community, Retrieved on Jun. 24, 2021, Webpage available at: https://forums.oneplus.com/threads/love-oneplus-concept-one-invisible-camera-you-can-thank-mclaren-and-boeing-for-it.1167279/.

"Chemists could Make 'Smart Glass' Smarter by Manipulating it at the Nanoscale", ScienceDaily, Retrieved on Jun. 24, 2021, Webpage available at: https://www.sciencedaily.com/releases/2019/06/190604131210.htm.

Xie et al., "Fast-switching quasi-solid state electrochromic full device based on mesoporous WO3 and NiO thin films", Solar Energy Materials and Solar Cells, vol. 200, Sep. 15, 2019, pp. 1-8.

"Nanophotonics Team creates Low-voltage, Multicolor, Electrochromic Glass", Phys Org, Retrieved on Jun. 24, 2021, Webpage available at: https://phys.org/news/2017-03-nanophotonics-team-low-voltage-multicolor-electrochromic.html.

Jarosz et al., "Transparent to Black Electrochromism—The "Holy Grail" of Organic Optoelectronics", Polymers, vol. 11, No. 2, Feb. 2019, pp. 1-18.

Xu et al., "High-contrast and Fast Electrochromic Switching Enabled by Plasmonics", Nature Communications, vol. 7, Article No. 10479, Jan. 2016, pp. 1-6.

Dillavou et al., "The Virtual Frame Technique: Ultrafast Imaging with any Camera", Optics Express, vol. 27, No. 6, Mar. 18, 2019, pp. 8112-8120.

Dounis et al., "Electrochromic Device Modeling Using an Adaptive Neuro-fuzzy Inference System: a Model-free Approach", Energy and Buildings, vol. 110, Jan. 1, 2016, pp. 182-194.

Extended European Search Report received for corresponding European Patent Application No. 20186183.8, dated Dec. 18, 2020, 4 pages.

* cited by examiner

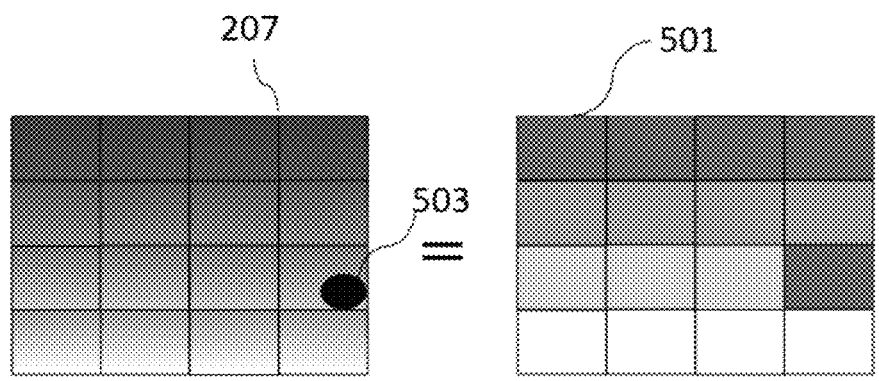
FIG. 5A
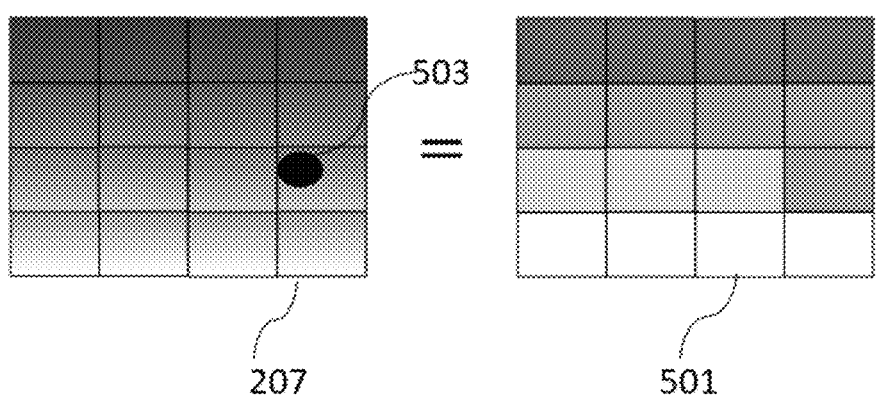
FIG. 5B
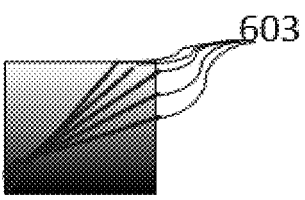
FIG. 6A
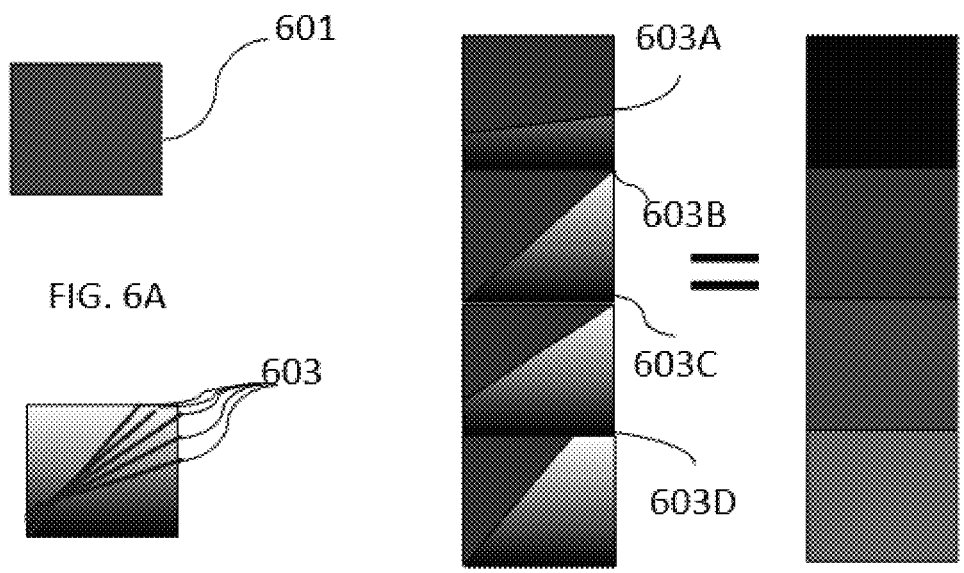
FIG. 6B
FIG. 6C

APPARATUS, METHOD AND COMPUTER PROGRAM FOR IMAGE CAPTURING

TECHNOLOGICAL FIELD

Examples of the present disclosure relate to an apparatus, method and computer program for image capturing. Some relate to an apparatus, method and computer programs for capturing an image with high resolution.

BACKGROUND

Electronic devices, such as smart phones, that can enable images to be captured are known. It is useful to enable such devices to obtain high quality images by improving the resolution of the images.

BRIEF SUMMARY

According to various, but not necessarily all, examples of the disclosure there is provided an apparatus comprising means for: activating at least one filter wherein the at least one filter is positioned in front of at least one image sensor and the at least one filter is configured to at least partially filter light such that the at least one filter has a spatial variation of transparency on an analogue scale across an area covered by the at least one filter; detecting an image captured by the at least one image sensor; and using information relating to the spatial variation of transparency of the at least one filter to determine sub-pixel information in the captured image.

The at least one filter may comprise electrochromic glass and activating the at least one filter may comprise providing a potential difference across the electrochromic glass.

A plurality of electrodes may be coupled to the electrochromic glass and configured to enable different potential differences to be applied to different areas of the electrochromic glass and the apparatus may be configured to activate the at least one filter by enabling different potential differences to be provided to different electrodes at different times.

The potential differences applied to the different electrodes may be configured to control the spatial variation of transparency of the at least one filter.

The means may be configured to enable spatial and/or temporal variation of the transparency of the at least one filter.

The apparatus may be configured to coordinate the timing of the activating of the at least one filter with a timing of capturing of an image by the image sensor so that the image is captured a predetermined time after the activation of the at least one filter has been initiated.

Spatial positions of defects in the at least one filter may be used to determine sub-pixel information.

The apparatus can be configured to calibrate the at least one filter by causing the at least one image sensor to capture a first image of a scene without using the at least one filter and a second image of the scene using the at least one filter and comparing the two images to determine information about the spatial variation of transparency of the at least one filter.

The apparatus can be configured to determine an angle of an edge at a sub pixel resolution using the intensity of a pixel of the at least one image sensor and information about the spatial variation of the transparency of the at least one filter in an area overlaying the pixel.

The apparatus can be configured to detect a plurality of images of a scene at different times with the at least one filter in different configurations having different spatial variations of transparency and use the different intensities of pixels of the at least one image sensor at the different times to determine sub pixel information.

The apparatus can be configured to control the spatial variation of transparency of the at least one filter in a first direction at a first time while a first image of a scene is captured and to control the spatial variation of transparency of the at least one filter in a second direction at a second time while a second image of the scene is captured and compare intensity values of pixels in the first image with intensity values of pixels in the second image to determine sub-pixel information.

According to various, but not necessarily all, examples of the disclosure there is provided an apparatus comprising: at least one processor; and at least one memory including computer program code; the at least one memory and the computer program code configured to, with the at least one processor, cause the apparatus at least to perform: activating at least one filter wherein the at least one filter is positioned in front of at least one image sensor and the at least one filter is configured to at least partially filter light such that the at least one filter has a spatial variation of transparency on an analogue scale across an area covered by the at least one filter; detecting an image captured by the at least one image sensor; and using information relating to the spatial variation of transparency of the at least one filter to determine sub-pixel information in the captured image.

According to various, but not necessarily all, examples of the disclosure there is provided an image capturing device comprising an apparatus as described above.

According to various, but not necessarily all, examples of the disclosure there is provided a method comprising: activating at least one filter wherein the at least one filter is positioned in front of at least one image sensor and the at least one filter is configured to at least partially filter light such that the at least one filter has a spatial variation of transparency on an analogue scale across an area covered by the at least one filter; detecting an image captured by the at least one image sensor; and using information relating to the spatial variation of transparency of the at least one filter to determine sub-pixel information in the captured image.

In some methods, the at least one filter comprises electrochromic glass and activating the at least one filter comprises providing a potential difference across the electrochromic glass.

According to various, but not necessarily all, examples of the disclosure there is provided computer program comprising computer program instructions that, when executed by processing circuitry, cause: activating at least one filter wherein the at least one filter is positioned in front of at least one image sensor and the at least one filter is configured to at least partially filter light such that the at least one filter has a spatial variation of transparency on an analogue scale across an area covered by the at least one filter; detecting an image captured by the at least one image sensor; and using information relating to the spatial variation of transparency of the at least one filter to determine sub-pixel information in the captured image.

BRIEF DESCRIPTION

Some examples will now be described with reference to the accompanying drawings in which:

FIG. 1 shows an example apparatus;

FIG. 2 shows an example image capturing device;
FIG. 3 shows an example method;
FIG. 4 shows an example method;
FIGS. 5A and 5B show an example implementation;
FIGS. 6A to 6C show an example implementation; and
FIG. 7 shows an example implementation;

DETAILED DESCRIPTION

Examples of the disclosure relate to apparatus 101, methods and computer programs 109 that can be used in image capturing devices 201. The apparatus 101, methods and computer programs 109 can enable high resolution images to be obtained. The apparatus 101, methods and computer programs 109 can enable sub-pixel information to be determined in the images.

FIG. 1 schematically illustrates an apparatus 101 according to examples of the disclosure. The apparatus 101 illustrated in FIG. 1 may be a chip or a chip-set. In some examples the apparatus 101 may be provided within image capturing devices 201 such as cameras or mobile phones or other suitable devices.

In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc.) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIGS. 3 and 4. The processor 105 by reading the memory 107 is able to load and execute the computer program 109.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: activating 301 at least one filter 207 wherein the at least one filter 207 is positioned in front of at least one image sensor 203 and the at least one filter 207 is configured to at least partially filter light such that the at least one filter 207 has a spatial variation of transparency on an analogue scale across an area covered by the at least one filter 207; detecting 303 an image captured by the at least one image sensor 203; and using 305 information relating to the spatial variation of transparency of the at least one filter 207 to determine sub-pixel information in the captured image.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: activating 301 at least one filter 207 wherein the at least one filter 207 is positioned in front of at least one image sensor 203 and the at least one filter 207 is configured to at least partially filter light such that the at least one filter 207 has a spatial variation of transparency on an analogue scale across an area covered by the at least one filter 207; detecting 303 an image captured by the at least one image sensor 203; and using 305 information relating to the spatial variation of transparency of the at least one filter 207 to determine sub-pixel information in the captured image.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIGS. 3 and 4 can represent steps in a method and/or sections of code in the computer program 109. The illustration of a particular order to the blocks does not necessarily imply that there is a required or preferred order for the blocks and the order and arrangement of the block may be varied. Furthermore, it can be possible for some blocks to be omitted.

FIG. 2 schematically shows an example image capturing device 201 that comprises an apparatus 101 as shown in FIG. 1. The image capturing device 201 could be a camera or a mobile phone or any other suitable device for capturing images.

In the example shown in FIG. 2 the image capturing device 201 also comprises an image sensor 203, a filter 207 and an optical arrangement 205. In the example shown in FIG. 2 the image capturing device 201 comprises one image sensor 203, filter 207 and optical arrangement 205 however it is to be appreciated that more than one image sensor 203, filter 207 and/or optical arrangement 205 could be provided in other examples of the disclosure. It is to be appreciated that only components referred to in the following description have been shown in FIG. 2 and that other components could be provided in other examples of the disclosure.

The image sensor 203 can comprise any means which can be configured to detect images. The image sensor 203 is coupled to the apparatus 101 to enable detected images to be stored in the memory 107 of the apparatus 101. The image sensor 203 can comprise any suitable type of image sensor. For instance, the image sensor 203 can comprise a digital image sensor such as a charge-coupled-device (CCD) or a complementary metal-oxide-semiconductor (CMOS). The image sensor 203 can comprise a plurality of pixels arranged in a pixel array.

The optical arrangement 205 can comprise any means which can be configured to direct images to the image sensor 203. The optical arrangement 205 can comprise means for focusing or otherwise adjusting the images onto the image sensor 203. The optical arrangement 205 can comprise one or more optical devices such as one or more lenses.

The optical arrangement 205 can be positioned in front of the image sensor 203 so as to enable the images to be directed onto the image sensor 203. The optical arrangement 205 can be positioned between the filter 207 and the image sensor 203.

The filter 207 comprises any means that can be configured to at least partially filter light. The filter 207 can be configured to filter light 207 in the visible range of the electromagnetic spectrum. The filter 207 is positioned in front of the image sensor 203 so that light passes through the filter 207 before it is incident on the image sensor 203. In the example shown in FIG. 2 the filter 207 is also positioned in front the optical arrangement 205.

In some examples the filter 207 can be provided as part of an outer housing of the image capturing device 201. In such examples the filter 207 could comprise part of the outer surface of the image capturing device 201.

The filter 207 can be configured so that it has a spatial variation of transparency across the area covered by the filter 207. In some examples the spatial variation of the transparency can cover the whole area of the filter 207. In other examples the spatial variation of the transparency of the filter 207 could only cover a portion of the filter 207. The spatial variation of the transparency of the filter 207 varies on an analogue scale so that the transparency of the filter 207 varies on a scale that is much smaller than the size of the pixels of the image sensor 203.

In the example shown in FIG. 2 the filter 207 comprises electrochromic glass. Other types of filter 207 could be used in other examples of the disclosure. The electrochromic glass is configured to switch from opaque to at least partially transparent when a potential difference is applied across the electrochromic glass.

In the example shown in FIG. 2 a plurality of electrodes 209 are coupled to the filter 207 to enable a potential difference to be applied across the electrochromic glass of the filter 207. The electrodes 209 are coupled to the apparatus 101 so that the apparatus 101 can control the potential difference between the electrodes 209 and so control the switching of the electrochromic glass between opaque and transparent. This enables the filter 207 to be activated. The potential difference could have a value of around 1V or any other suitable value.

When the potential difference is applied to the electrochromic glass the switching from opaque to transparent does not happen instantaneously. There is a time delay between the potential difference being applied and the switch occurring. The switch from opaque to transparent does not occur uniformly across the area covered by the filter 207. The switch begins at the electrodes 209 and spreads outwards across the area covered by the filter 207. This therefore gives a spatial variation in the transparency of the filter 207. In some cases the switch can take up to several seconds.

In other cases the filter 207 can be designed to provide for faster switching from opaque to transparent. For example, electrochromic glass can be created that allows for faster ionic diffusion and so allows for faster switching. The faster ionic diffusion can be achieved by controlling the porosity, ion type, type of charge carrier or any other suitable factor. In such examples the switching time for the filter 107 could be around one second or lower.

In some examples the electrodes 209 around the filter 207 can be positioned so as to control the spatial variation in the transparency of the filter 207. For example, a plurality of different electrodes 209 can be distributed at different positions around the filter 207. This can enable the transition from opaque to transparent to be initiated at different locations of the filter 207 and so can enable different spatial variations of transparency to be provided by the filter 207 depending on which electrodes 209 have been activated.

In some examples the spatial variation in transparency of the filter 207 can be provided in more than one direction. For example, the filter 207 can be controlled to provide a variation of transparency in a horizontal direction and/or a vertical direction, or any other suitable directions. In some examples the filter 207 can be controlled to provide the spatial variation in transparency in different directions to be provided during a single exposure of the image sensor 203. This can enable more accurate sub-pixel information to be obtained than could be obtained if the transparency of the filter 207 only varied in a single direction.

The spatial variation of the filter 207 has an analogue scale. The spatial variation may be analogue in that it varies over a much smaller range than the dimensions of the pixels of the image sensor 203. The spatial variation could be on a nanometre or molecular scale.

It is to be appreciated that the example image capturing device 201 shown in FIG. 2 is an example and that variations of this example could be used in examples of the disclosure. For instance, in some examples the image capturing device 201 could comprise a plurality of image sensors 203. Such a device could be a smart phone with multiple cameras or any other suitable type of device. The plurality of image sensors 203 could be positioned behind the same filter 207. The filter 207 can be configured to provide different spatial variations in transparency for the different regions in front of the different image sensors 203. For instance, a horizontal variation in transparency could be provided in a first region in front of a first image sensor 203 while a vertical variation in transparency could be provided in a second region in front of a second image sensor 203. Such an arrangement can enable a plurality of images to be captured at the same time and so can enable improved sub-pixel information to be obtained.

FIG. 3 shows an example method that can be implemented by an apparatus 101 as shown in FIG. 1 or 2.

At block 301 the method comprises activating at least one filter 207. The filter 207 could comprise electrochromic glass as shown in FIG. 2 or any other suitable type of material. Activating the filter 207 can comprise providing a potential difference to the electrodes 209 so as to cause a potential difference to be applied to the electrochromic glass which causes the electrochromic glass to transition from opaque to transparent in the electrochromic glass.

The transition of the electrochromic glass takes a period of time such that during the transition the transparency of the filter 207 varies on an analogue scale. In some examples the activating of the filter 207 can be controlled to control the spatial variation of transparency. For example, different electrodes at different positions could be activated at different times to enable the transition from opaque to transparent to be triggered at different times for different sections of the filter 207.

In some examples the electrodes 209 can be configured so that the variation in transparency can extend in different directions on different occasions. For example, electrodes 209 that are positioned to the sides of the filter 207 could control the spatial variation in a horizontal direction while electrodes 209 that are positioned along top and bottom edges of the filter 207 could control the transparency in a vertical direction.

The filter 207 is positioned in front of the image sensor 203 so as to at least partially filter light incident on the image sensor 203 when an image is captured. The spatial variation of transparency of the filter 207 creates a spatial variation in the light that is filtered before it is incident on the image sensor 203.

At block 303 the method comprises detecting an image captured by the at least one image sensor 203. The captured image can comprise a plurality of pixels corresponding to the pixel array of the image sensor 203.

At block 305 the method comprises using information relating to the spatial variation of transparency of the filter 207 to determine sub-pixel information in the captured image. The sup-pixel information could comprise the angle of edges, the position of objects within an image or any other suitable type of information.

The detected image comprises an image representing a scene that is positioned in the field of view of the image capturing device 201. As the filter 207 is positioned in front of the image sensor 203 the detected image also comprises a variation in light intensity that corresponds to the spatial variation of transparency of the filter 207. Information relating to this spatial variation of transparency can therefore be used to determine information on a scale that is smaller than the pixels of the image sensor 203.

Information relating to the spatial variation of transparency of the filter 207 can be determined by calibrating the filter 207. For example, one or more images of a known scene can be captured while the filter is used. This can enable information relating to the spatial variation of transparency of the filter 207 to be determined. This information can be stored in the memory 107 of the apparatus 101 and accessed as needed.

It is to be appreciated that the filter 207 could have a plurality of available of settings that each have a different spatial variation of transparency. For example, the electrodes 209 could be activated with different timing sequences or electrodes in different locations could be activated. Information relating to the spatial variation of transparency of the filter 207 for each of these settings could be stored in the memory 107 and accessed as needed.

In some examples the different settings of the filter 207 could correspond to different time delays following activation. The switch from opaque to transparent does not happen instantaneously and so different spatial variations of transparency would be provided at different points in time after the filter 207 has been activated. When determining the sub pixel information the time delay between the activation of the filter 207 and the image being captured would be taken into account.

The apparatus 101 can be configured to coordinate the timing of the activating of the filter 207 with a timing of capturing of an image by the image sensor 203 so that the image is captured a predetermined time after the activation of the filter 207 has been initiated. The predetermined time can be selected to ensure that a known spatial variation of transparency of the filter 207 is provided. In some examples, environmental factors can be taken into account when the timing of the capturing of the image is being controlled. For example, the temperature may affect the time it takes for the filter 207 to transition between opaque and transparent and so information relating to the current temperature could be used to control the timing of the image sensor 203.

FIGS. 5 to 7 show examples of how information relating to the spatial variation of transparency of the filter 207 can be used to determine sub-pixel information of the image.

Figure 1:
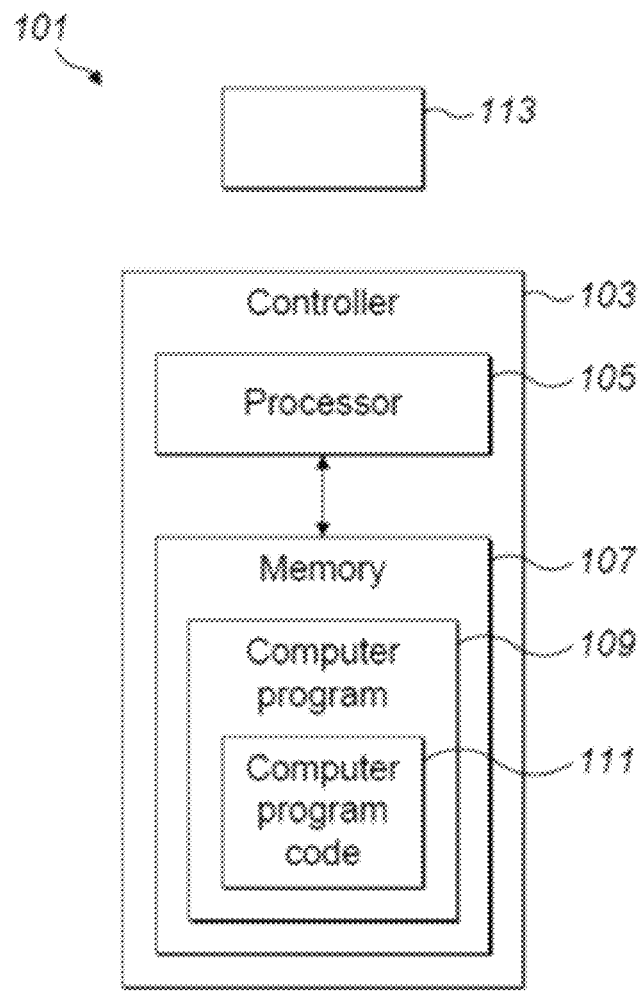
Figure 2:
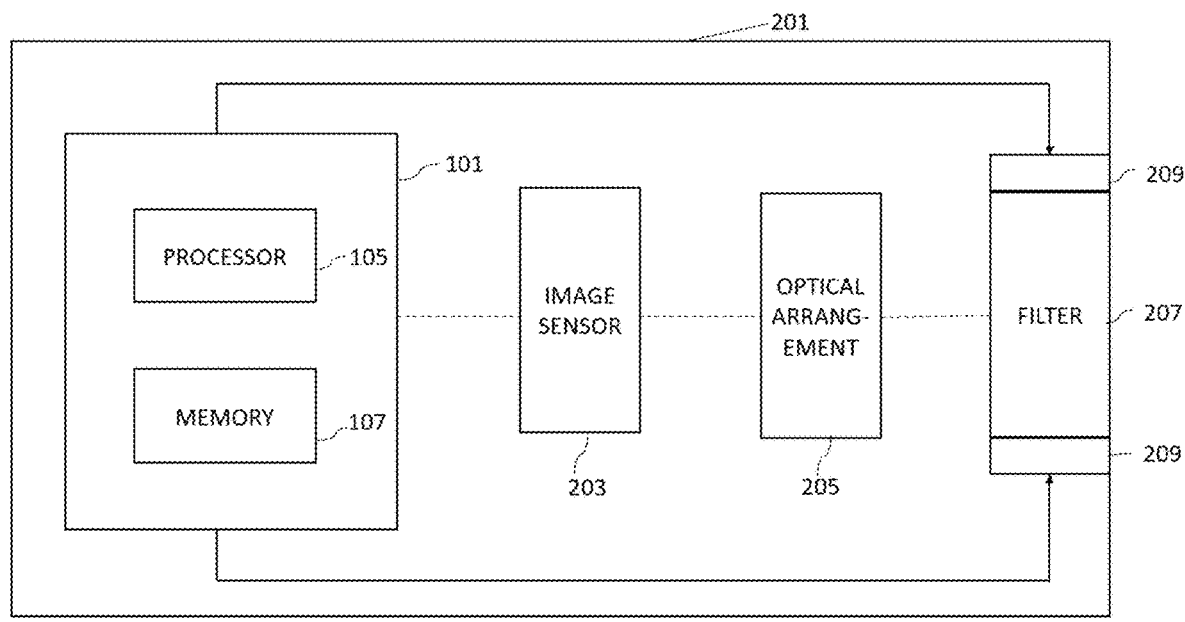
Figure 3:
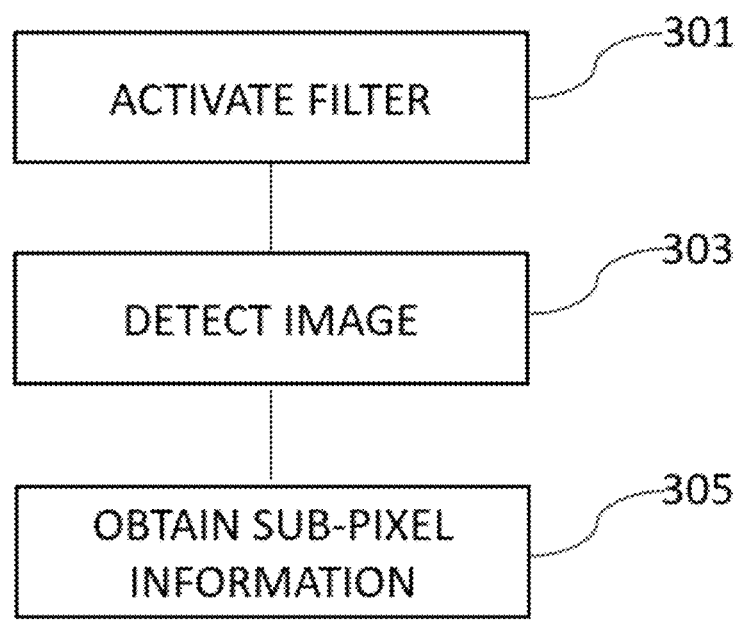
Figure 4:
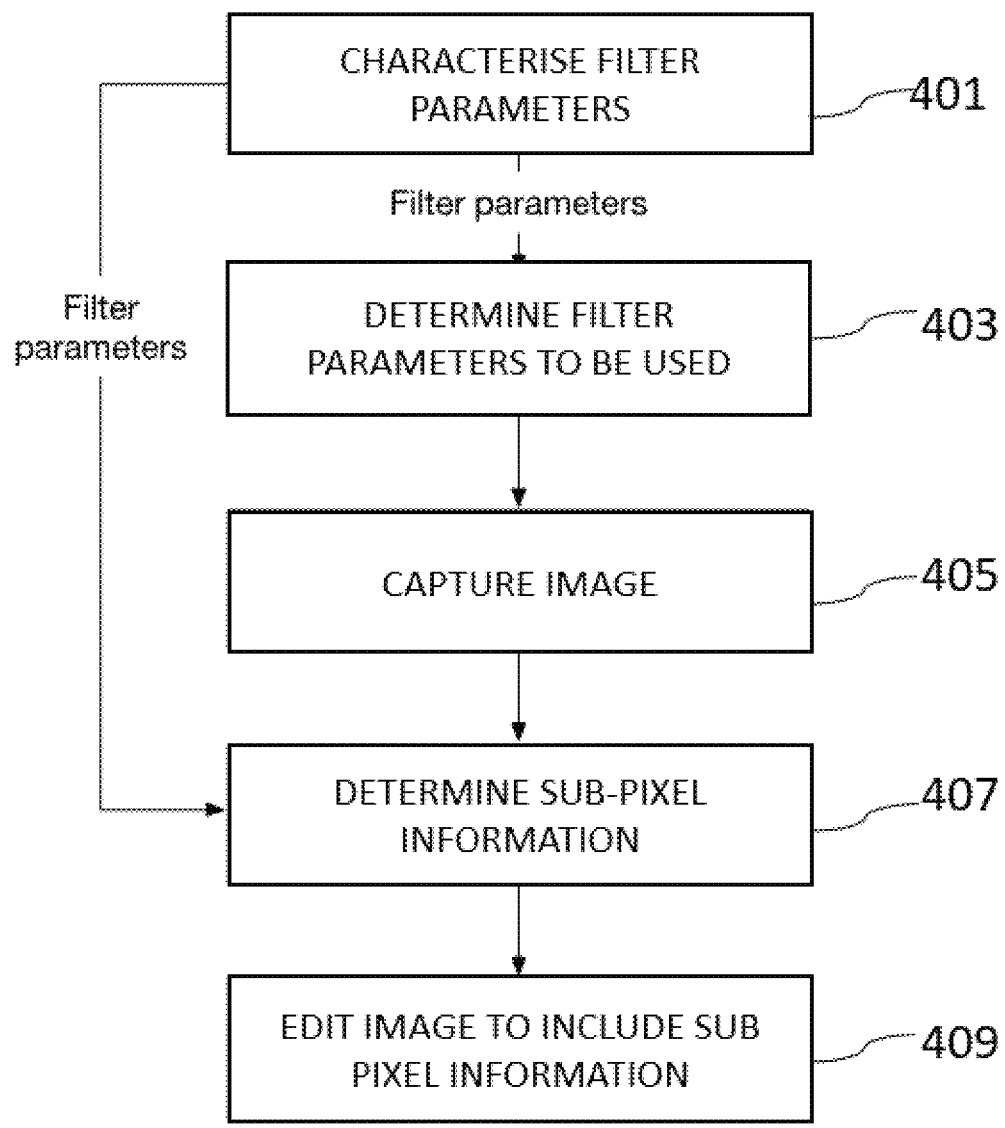
FIG. 4 shows an example method that could be implemented using an apparatus 101 and image capturing device 201 as described above.

The method comprises, at block 401, characterizing parameters of the filter 207. The parameters of the filter 207 can be characterized by a module of the apparatus 101 that could be implemented using a computer program or any other suitable means.

The parameters of the filter 207 can comprise any parameters that affect how light is filtered by the filter. The characterization of the parameters of the filter 207 can provide information about the spatial variation of transparency of the filter 207. This information could be stored in a database or look up table or any other suitable means.

In some examples different settings of the filter 207 can be characterised. The characterization of the settings can define the spatial variation of transparency of the filter 207 for each of the settings. The different settings could relate to different activation sequences of the filter 207. For example, they could relate to activating different electrodes 209 to create a different spatial variation of transparency of the filter 207. In some examples there could be a setting relating to a spatial variation in a horizontal direction and another setting relating to a spatial variation in a vertical direction. In some examples the setting could comprise varying the transparency in both a horizontal direction and a vertical direction during a single exposure. These different settings could be created by actuating different electrodes 209 that are coupled to different points of the filter 207.

In some examples the different settings can relate to different timings between the activation of the filter 207 and the capturing of the image by the image sensor 203. The timing settings could be calibrated for environmental factors such as temperature, or any other environmental parameter that could affect the time it takes for the filter 207 to transition between opaque and transparent.

In some examples characterising the filter 207 parameters could comprise determining features that are unique to the filter 207. For example, the filter 207 could comprise imperfections or defects within the filter 207 that could result in localised anomalies in the spatial variation of transparency of the filter 207. These imperfections or defects could be on a molecular or nanometre scale that is much smaller than the scale of the pixels of the image sensor 203. The locations of the imperfections or defects could be determined by capturing calibration images or by any other suitable method. These defects and imperfections can affect the spatial variation in transparency of the filter 207.

At block 403 the filter parameters that are to be used are determined.

In some examples the parameters that are to be used can be influenced by settings of the image capturing device 201 such as aperture size, exposure time, flash settings or any other suitable factors. In some examples the parameters can be influenced by information from the scene that is to be imaged by the image capturing device 201 such as a light level, the positions and geometries of objects within the scene or any other suitable parameters. The information from the scene could be obtained from a prior image captured by the image capturing device 201. Other factors that influence the parameters of the filter 207 could be used in other examples.

In some examples determining which filter parameters are to be used could comprise determining whether the filter 207 should be used or not. For instance, if light levels are below a threshold then using the filter 207 would reduce the light in the image even further. In such cases it could be determined that the filter 207 is only used if light levels are above a threshold.

In some examples determining which filter parameters are to be used could comprise selecting a set of filter 207 parameters from an available group of parameters. For instance, a look up table could be used to associated filter parameters with factors relating to the settings of the image capturing device 201, and/or factors relating to the scene to be imaged and/or any other suitable factors. When the image capturing device 201 identifies specific factors in the scene or settings of image capturing device 201 the associated set of filter parameters could then be selected using the look up table. In other examples the set of filter parameters could be selected by the user of the image capturing device 201. For example, the user could select a set of parameters from a menu of available parameters.

In some examples different orientations of the spatial variation of transparency of the filter 207 could be selected depending on the orientation of the image capturing device 201. For instance, if the image capturing device 201 is in portrait mode a spatial variation of transparency of the filter 207 in a vertical direction could be used while if the image capturing device 201 is in landscape mode a horizontal spatial variation of transparency of the filter 207 could be used. Therefore, in effect, a vertical direction of spatial variation of transparency of the filter 207 can be maintained for the image being captured, whether the image capturing device 201 is in portrait mode or landscape mode. The direction of the spatial variation of the filter 207 could be controlled by controlling the electrodes 209 that are activated or the sequence in which the electrodes 209 are activated.

Other factors and methods for determining which filter parameters are to be used could be used in other examples of the disclosure.

At block 405 the method comprises capturing an image using the image sensor 203. The image can be captured while the filter 207 is activated so the filter 207 has a spatial variation of transparency.

At block 407 sub-pixel information of the image is determined. The sub-pixel information could comprise the position of edges or objects within the image or any other suitable information.

The filter parameters that provide information relating to the spatial variation of transparency of the filter 207 are used to determine the sub-pixel information. For example, if a predetermined setting of the filter has been used, then the spatial variation of transparency of the filter 207 associated with that setting can be identified. The information about the spatial variation of transparency of the filter 207 could be retrieved from a look up table or other suitable database. This information about the spatial variation in transparency of the filter 207 can then be used to determine how light has been filtered prior to the image sensor 203. This can provide information about the variation in the filtering of the light on a scale that is smaller than the pixels of the image sensor 203.

The apparatus 101 can use any suitable algorithms or processes to determine the sub-pixel information. The algorithms or processes could be rules based or machine learning or any other suitable type of process or algorithm.

FIGS. 5A to 7 show principles that can be used to use the filter parameters to determine the sub-pixel information.

At block 409 the method comprises editing the captured image to include the sub-pixel information. This can enable an image to be provided that has a higher resolution than the pixels. In some examples the image data could be up-scaled to a higher resolution than the pixel resolution of the image sensor 203. For example, each pixel of the image obtained by the image sensor 203 can be multiplied into a square of four identical sub pixels having the same intensity and colour values as the original pixel. The sub-pixel information can then be used to edit the upscaled pixels.

FIGS. 5A and 5B show some principles of how the information relating to the spatial variation of the transparency of the filter 207 can be used to determined sub-pixel information. FIGS. 5A and 5B show the same filter 207 and array of pixels 501 capturing an image of an object 503 in two slightly different positions.

The filter 207 shown in FIGS. 5A and 5B has a transparency that varies in a vertical direction. The lower edge of the filter 207 is transparent or almost transparent whereas the upper edge of the filter 207 is more opaque. The transparency varies continuously from transparent to opaque across the area covered by the filter 207. It is to be appreciated that the variation in transparency shown in FIGS. 5A and 5B is for illustrative purposes and that other variations could be used in other examples of the disclosure.

An object 503 is shown in both FIGS. 5A and 5B, this can be the same object 503 at different positions. In FIG. 5A the object 503 is in a position that corresponds to a lower right corner of a pixel while in FIG. 5B the object 503 is in a position that corresponds to an upper right corner of the same pixel 503. Without the filter 207 the image sensor 203 would not be able to differentiate between these two positions of the object 503.

In the array of pixels 501 shown in FIG. 5A the pixels that don't comprise the object 503 vary in brightness from the lower edge to the upper edge. The pixels at the lower edge of the array are brighter because the filter 207 is more transparent in this region.

The pixel that corresponds to the object 503 is darker than the other pixels as this contains the image of the object 503.

In the array of pixels 501 shown in FIG. 5B the pixel that corresponds to the object 503 has a different intensity to the same pixel as shown in FIG. 5A. This difference in the intensity of the pixel is caused by the spatial variation of the transparency of the filter 207. In the example of FIG. 5B the object 503 is located at a slightly higher location within the area covered by the filter 207. This means that the light from the object 503 is filtered more by the filter 207 in FIG. 5B than in FIG. 5A. This means that the intensity of the pixel in FIG. 5B is not as bright as the intensity of the pixel in FIG. 5A. If the object 503 is a known object then intensity of the pixel can give an indication of the position of the object 503 within the pixel.

This principle can be used to determine the location of objects such as edges at sub-pixel resolution.

FIGS. 6A to 6C show the principles of another example implementation that can be used to locate edges at a sub-pixel resolution.

FIG. 6A shows a pixel value that can be obtained. The pixel 601 can be located anywhere within the image sensor 203. The pixel value comprises a combination of information from an object that is being imaged and the spatial variation of transparency of the filter 207.

FIG. 6B shows possible edge angle space for the pixel 601. The possible edge angle space could be estimated using information form adjacent pixels or the surrounding area. Five possible edge angles 603 are shown by the lines in FIG. 6B. It is to be appreciated that the variance in these possible edge angles 603 has been exaggerated to show the principles of the method more clearly.

FIG. 6B also shows the spatial variation in transparency of the filter 207 across the pixel. In this example the transparency varies continuously from opaque at the bottom to transparent at the top. It is to be appreciated that this variation has also been exaggerated in FIG. 6B so as to show the principle more clearly.

FIG. 6C shows the some of the different edge angles 603 for the object and the corresponding pixel values that would be obtained for those edge angles. The variation in transparency of the filter 207 is shown with the different edge angles 603 to show how this affects the light that is filtered.

The first edge angle 603A is positioned so that the object is estimated to cover most of the upper area of the pixel. This estimation results in a pixel value with a low brightness being obtained because most of the light that is not from the object is filtered by the filter 207.

The second edge angle 603B is positioned so that the object is estimated to be in a different position which enables more light to pass through the filter 207 and so results in a pixel with a higher brightness value. Similarly, the third edge angle 603C is positioned so that the object is estimated to be in a position which allows even more light to pass through the filter 207 and so provides an even higher brightness value of the pixel. The fourth edge angle 603D provides the brightest pixel value because for this angle the object is estimated to be in a position that allows the most light through the filter 207.

The apparatus 101 can determine an edge angle by matching the observed pixel value to the values estimated for the different edge angles. This process could be performed using machine learning, rules based algorithms, look up tables or any other suitable process.

Once an angle within the edge angle space has been selected the image captured by the image sensor 203 can be edited to use the selected angles.

Figure 7:
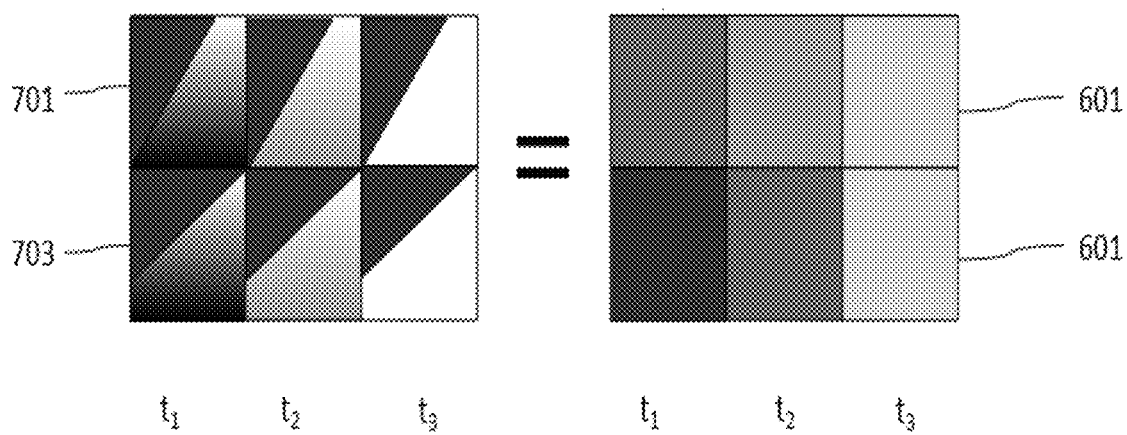

FIG. 7 shows an example of how monitoring a change in the intensity of the pixel over a period of time can be used to resolve an edge angle. FIG. 7 shows two rows of an identical pixel 601 at three different times $t_1$, $t_2$ and $t_3$. The top row 701 shows an object with a first edge angle and the bottom row 703 shows an object with a second, different edge angle.

Three different images can be obtained at three times $t_1$, $t_2$ and $t_3$. As the filter 207 does not transition from opaque to transparent instantaneously the filter 201 has different transparency levels at the three different times. In the example shown in FIG. 7 at time $t_1$ the filter 207 is almost opaque, at time $t_2$ the filter is midway between opaque and transparent and at time $t_3$ the filter 207 is almost transparent. The spatial variation of the transparency of the filter 207 at these times can be known from calibration of the filter 207 or from any other suitable method.

The different positions of the edge angles of the object in the two rows allow different amounts of light through at different times. The variation of the intensity of the light at the different times can be used to provide an indication of the edge angle. In the example in FIG. 7 the second edge angle in the bottom row 703 has a greater change in intensity for the different time instances. This shows that the filter 207 has more of an effect for this edge angle. This information can be used to determine the edge angles and edit the images obtained by the image sensor 203 accordingly.

Examples of the disclosure therefore enable sub-pixel information to be obtained which can be used to edit images captured by the image sensor 203.

In some examples the distance between the filter 207 and the image sensor 203 could be used to resolve further information about the scene being imaged. For example, this information could be used to resolve three dimensional information or to improve a depth of focus of the image capturing device.

As mentioned above, in some examples, the filter 207 could comprise imperfections or defects within the filter 207 that could result in localised anomalies in the spatial variation of transparency of the filter 207. These imperfections or defects and the locations of them within the filter 207 would be unique to any particular image capturing device 201. This can enable the imperfections and defects to provide a unique identification of an image capturing device. This could provide an unclonable means of authenticating images captured by the image capturing device 201. For instance, an image captured using the filter 207 will contain information relating to these imperfections or defects. This can then be extracted from the image data to confirm whether the image has been captured by the image capturing device 201 or a different device. This could be used to provide a signature or watermark that authenticates images captured by the imaging device 201. In some examples this could be used to authenticate the image capturing device 201. For instance, the image capturing device 201 could be used to capture an image of a known scene using the filter 207. The imperfections or defects in the filter would create sub-pixel variations that could be used to identify the image capturing device 201.

In some examples the apparatus 101 can use machine learning which can include statistical learning to identify the sub-pixel information. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . ." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. An apparatus comprising:
   at least one processor; and
   at least one memory including computer program code;
   the at least one memory and the computer program code configured to, with the at least one processor, cause the apparatus to:
   activate at least one filter wherein the at least one filter is positioned in front of at least one image sensor and the at least one filter is configured to at least partially filter light such that the at least one filter has a spatial variation of transparency on an analogue scale across an area covered by the at least one filter;
   detect an image captured by the at least one image sensor; and use information relating to the spatial variation of transparency of the at least one filter to determine sub-pixel information in the captured image, wherein the at least one memory and the computer program code are further configured to, with the at least one processor, cause the apparatus to: determine an angle of an edge at a sub pixel resolution using the intensity of a pixel of the at least one image sensor and information about the spatial variation of the transparency of the at least one filter in an area overlaying the pixel.

2. An apparatus as claimed in claim 1 wherein the at least one filter comprises electrochromic glass and activating the at least one filter comprises providing a potential difference across the electrochromic glass.

3. An apparatus as claimed in claim 2 wherein a plurality of electrodes are coupled to the electrochromic glass and configured to enable different potential differences to be applied to different areas of the electrochromic glass and the apparatus is configured to activate the at least one filter by enabling different potential differences to be provided to different electrodes at different times.

4. An apparatus as claimed in claim 3 wherein the potential differences applied to the different electrodes are configured to control the spatial variation of transparency of the at least one filter.

5. An apparatus as claimed in claim 1 wherein the at least one memory and the computer program code are configured to, with the at least one processor, cause the apparatus to: enable spatial or temporal variation of the transparency of the at least one filter.

6. An apparatus as claimed in claim 1 wherein the at least one memory and the computer program code are configured to, with the at least one processor, cause the apparatus to: coordinate the timing of the activating of the at least one filter with a timing of capturing of an image by the image sensor so that the image is captured a predetermined time after the activation of the at least one filter has been initiated.

7. An apparatus as claimed in claim 1 wherein spatial positions of defects in the at least one filter is used to determine sub-pixel information.

8. An apparatus as claimed in claim 1 wherein the at least one memory and the computer program code are configured to, with the at least one processor, cause the apparatus to: calibrate the at least one filter by causing the at least one image sensor to capture a first image of a scene without using the at least one filter and a second image of the scene using the at least one filter and comparing the two images to determine information about the spatial variation of transparency of the at least one filter.

9. An apparatus as claimed in claim 1 wherein the at least one memory and the computer program code are configured to, with the at least one processor, cause the apparatus to: detect a plurality of images of a scene at different times with the at least one filter in different configurations having different spatial variations of transparency and use the different intensities of pixels of the at least one image sensor at the different times to determine sub pixel information.

10. An apparatus as claimed in claim 1 wherein the at least one memory and the computer program code are configured to, with the at least one processor, cause the apparatus to: control the spatial variation of transparency of the at least one filter in a first direction at a first time while a first image of a scene is captured and to control the spatial variation of transparency of the at least one filter in a second direction at a second time while a second image of the scene is captured and compare intensity values of pixels in the first image with intensity values of pixels in the second image to determine sub-pixel information.

11. An apparatus as claimed in claim 1 wherein the apparatus is an image capturing device.

12. A method comprising:

activating at least one filter wherein the at least one filter is positioned in front of at least one image sensor and the at least one filter is configured to at least partially filter light such that the at least one filter has a spatial variation of transparency on an analogue scale across an area covered by the at least one filter;

detecting an image captured by the at least one image sensor; and using information relating to the spatial variation of transparency of the at least one filter to determine sub-pixel information in the captured image, the method further comprising:

determining an angle of an edge at a sub pixel resolution using the intensity of a pixel of the at least one image sensor and information about the spatial variation of the transparency of the at least one filter in an area overlaying the pixel.

13. A method as claimed in claim 12 wherein the at least one filter comprises electrochromic glass and activating the at least one filter comprises providing a potential difference across the electrochromic glass.

14. A method as claimed in claim 12 further comprising: enabling spatial or temporal variation of the transparency of the at least one filter.

15. A method as claimed in claim 12 further comprising: using spatial positions of defects in the at least one filter to determine sub-pixel information.

16. A non-transitory computer readable medium comprising program instructions stored thereon for performing at least the following:

activate at least one filter wherein the at least one filter is positioned in front of at least one image sensor and the at least one filter is configured to at least partially filter light such that the at least one filter has a spatial variation of transparency on an analogue scale across an area covered by the at least one filter;

detect an image captured by the at least one image sensor; and use information relating to the spatial variation of transparency of the at least one filter to determine sub-pixel information in the captured image, the non-transitory computer readable medium comprising program instructions stored thereon for further performing:

determine an angle of an edge at a sub pixel resolution using the intensity of a pixel of the at least one image sensor and information about the spatial variation of the transparency of the at least one filter in an area overlaying the pixel.

17. The non-transitory computer readable medium of claim 16 wherein the at least one filter comprises electrochromic glass and wherein the instructions are further configured to perform: activating the at least one filter comprising providing a potential difference across the electrochromic glass.

18. The non-transitory computer readable medium of claim 16 wherein the instructions are further configured to perform: enabling spatial or temporal variation of the transparency of the at least one filter.

19. The non-transitory computer readable medium of claim 16 wherein the instructions are further configured to perform: using spatial positions of defects in the at least one filter to determine sub-pixel information.

\* \* \* \* \*